(12) United States Patent  
Murosawa et al.

(10) Patent No.: US 7,046,502 B2  
(45) Date of Patent: May 16, 2006

(54) MULTILAYER CERAMIC CAPACITOR

(75) Inventors: Takako Murosawa, Chuo-ku (JP); Mari Miyauchi, Chuo-ku (JP); Kazunori Noguchi, Chuo-ku (JP); Akira Sato, Chuo-ku (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/092,730

(22) Filed: Mar. 30, 2005

(65) Prior Publication Data

US 2005/0254197 A1 Nov. 17, 2005

(30) Foreign Application Priority Data

Mar. 31, 2004 (JP) .............................. 2004-103126

(51) Int. Cl.  
*H01G 4/06* (2006.01)

(52) U.S. Cl. ..................... 361/321.2; 361/311; 501/134

(58) Field of Classification Search ........ 361/311–313, 361/321.1, 321.2, 321.3, 321.5, 306.3; 501/134–138  
See application file for complete search history.

(56) References Cited

U.S. PATENT DOCUMENTS 5,828,098 A * 10/1998 Shimada et al. ............ 257/310  
6,033,920 A * 3/2000 Shimada et al. ............... 438/3  
6,829,137 B1 * 12/2004 Konaka et al. .......... 361/321.4  
6,930,876 B1 * 8/2005 Noguchi et al. ............ 361/311

FOREIGN PATENT DOCUMENTS

| JP | A 5-62855 | 3/1993 |
| JP | A 2000-277369 | 10/2000 |
| JP | A 2001-307939 | 11/2001 |
| JP | A 2003-77761 | 3/2003 |
| JP | A 2003-100544 | 4/2003 |
| JP | A 2003-124049 | 4/2003 |
| JP | A 2003-133164 | 5/2003 |

* cited by examiner

*Primary Examiner*—Anthony Dinkins  
(74) *Attorney, Agent, or Firm*—Oliff & Berridge, PLC (57) ABSTRACT

A multilayer ceramic capacitor having an internal electrode layer and a dielectric layer having a thickness of less than 2 μm is provided, wherein the dielectric layer contains a plurality of dielectric particles, and when it is assumed that standard deviation of a particle distribution of the entire dielectric particles in the dielectric layer is σ (no unit), an average particle diameter of the entire dielectric particles in the dielectric layer is D50 (unit: μm), and a rate that dielectric particles (coarse particles) having an average particle diameter of 2.25 times of the D50 exist in the entire dielectric particles is p (unit: %), the σ and p satisfy σ<0.130 and p<12%; by which a TC bias characteristic can be expected to be improved while maintaining various electric characteristics, particularly a sufficient permittivity, even when the interlayer dielectric layer is made thin.

2 Claims, 7 Drawing Sheets

SAMPLE 9

FIG. 5

SAMPLE 1

MULTILAYER CERAMIC CAPACITOR

BACKGROUND OF THE INVENTION

1. Field of the Invention

The present invention relates to a multilayer ceramic capacitor.

2. Description of the Related Art

A multilayer ceramic capacitor is composed of an element body having the configuration that a plurality of dielectric layers and internal electrode layers are alternately stacked and a pair of external terminal electrodes formed on both and portions of the element body. The multilayer ceramic capacitor is produced by producing a pre-firing element body by alternately stacking pre-firing dielectric layers and pre-firing internal electrode layers exactly by necessary numbers first, then, after firing the same, forming a pair of external terminal electrodes on both end portions of the fired element body.

When producing a multilayer ceramic capacitor, since the pre-firing dielectric layers and the pre-firing internal electrode layers are fired at a time, a conductive material included in the pre-firing internal electrode layers is demanded to have a higher melting point than a sintering temperature of dielectric material powder included in the pre-firing dielectric layers, not to react with the dielectric material powder, and not to be dispersed in the fired dielectric layers, etc.

In recent years, to respond to the demands, as a conductive material included in the pre-firing internal elect layers, instead of conventionally used Pt, Pd and other precious metals, an Ag—Pd alloy to used, or those using Ni, which can be fired in a reducing atmosphere, and other inexpensive base metals by giving reduction-resistance to the dielectric material have been developed.

The case of using Ni as a conductive material included in the pre-firing internal electrode layers will be explained as an example. Ni has a lower melting point comparing with that of dielectric material powder included in the pre-firing dielectric layer. Therefore, when pre-firing dielectric layers and pre-firing internal electrode layers including Ni as a conductive material are fired at a time, due to a difference of sintering start temperatures of the dielectric material powder and Ni, Ni internal electrode tends to become thick to be eventually broken as sintering of the dielectric material powder proceeds. Thus, to suppress this kind of breaking due to firing and to suppress sintering, there is proposed a technique of adding an additive dielectric material as a sintering retarder to an internal electrode layer paste for forming the internal electrode layers (refer to the patent articles 1 to 5). The additive dielectric material has a property of being dispersed from the internal electrode layer side to the interlayer dielectric layer side at the time of firing pre-firing interlayer dielectric layers and pre-firing internal electrode layers at a time.

In recent years, as a result that a variety of electronic apparatuses became compact, a multilayer ceramic capacitor installed inside the electronic apparatuses has been demanded to realize a compact body with a larger capacity, a low price and high reliability. To respond to the demands, a fired internal electrode layer, fired interlayer dielectric layer arranged between mutually facing fired internal electrode layers have been made thinner. Specifically, a thickness after firing per one fired interlayer dielectric layer has become as thin as 1 µm or so and, along therewith, a thickness before firing per one pre-firing interlayer dielectric layer has also become thinner.

As the pre-firing interlayer dielectric layer becomes thinner, a content of a dielectric material per one dielectric layer for forming it decreases.

For example, the case of preparing an internal electrode layer paste obtained by adding an additive dielectric material at a predetermined weight ratio to Ni as a conductive material and forming by applying the paste to be a predetermined thickness to a plurality of pre-firing interlayer dielectric layers, wherein the pre-firing thickness is gradually made thinner, will be considered. At this time, the weight ratio of a content of the additive dielectric material in the internal electrode layer with respect to a content of the dielectric material in the pre-firing interlayer dielectric layer (a content of the additive dielectric material in the internal electrode layer/a content of the dielectric material in the pre-firing interlayer dielectric layer) gradually increases as the thickness of the pre-firing interlayer dielectric layer applied with the internal electrode layer paste becomes thinner. It is because a content of the dielectric material in the pre-firing interlayer dielectric lawyer decreases as the thickness of the pre-firing interlayer dielectric layer becomes thinner, so that a denominator of a formula of the above weight ratio becomes smaller, consequently, a value of the weight ratio becomes larger.

When considering this from the pre-firing interlayer dielectric layer side, it means that the thinner the thickness becomes, the larger an amount of the additive dielectric material to be dispersed from the internal electrode layer side relatively becomes. Namely, a relative dispersal amount from the internal electrode layer aide to the interlayer dielectric layer side increases.

Also, as the pre-firing interlayer dielectric layer becomes thinner as above, the pre-firing internal electrode layer is also demanded to be thinner, however, to make the pre-firing internal electrode layer thinner, the additive dielectric material as well as a conductive material, such as Ni, in the internal electrode layer paste for forming the same are demanded to be finer.

However, when the additive dielectric material to be dispersed from the internal electrode layer side to the interlayer dielectric layer side at the time of firing is made finer, grain growth of dielectric particles composing the interlayer dielectric layer may be accelerated to influence the fine structure of the interlayer dielectric layer in some cases. As explained above, the influence is furthermore enhanced when the dispersal amount of the additive dielectric material from the internal electrode layer aide to the interlayer dielectric layer side becomes larger. The influence on the fine structure can be ignored when a thickness of the fired interlayer dieleatric layer is made to be 2.0 µm or more, however, the influence on the fine structure tends to become large when the thickness of the fired interlayer dielectric layer is made thin as less than 2.0 µm. Along with the influence on the fine structure as such, it is liable that various characteristics, such as a bias characteristic and reliability, of a multilayer ceramic capacitor to be obtained are deteriorated.

To solve the disadvantages, the patent article 6 proposes a technique of adjusting additive composition for an internal electrode layer paste and adjusting a ratio of an average particle diameter of dielectric particles contacting the internal electrode layer after firing and that of not contacting dielectric particles, concentration ratio of additive components and a core-shell ratio. According to the technique described in the patent article 6, a dielectric layer can be made thinner without deteriorating a temperature characteristic, tanδ and lifetime. However, bias characteristics were not sufficiently improved in the technique described in the patent article 6, go that a problem to be solved still remained.

The patent article 7 discloses a multilayer ceramic capacitor wherein an adage particle diameter of dielectric particles near an eternal electrode is the same as or smaller than an average particle diameter of dielectric particles in an effective region.

However, the technique described in the patent article 7 is for a purpose of preventing cracks at the time of sintering the external electrode, and an improvement of the bias characteristics cannot be expected.

Patent Article 1: The Japanese Unexamined Patent Publication No. 5-62855

Patent Article 2: The Japanese Unexamined Patent Publication No. 2000-277369

Patent Article 3: The Japanese Unexamined Patent Publication No. 2001-307939

Patent Article 4: The Japanese Unexamined Patent Publication No. 2003-77761

Patent Article 5: The Japanese Unexamined Patent Publication No. 2003-100544

Patent Article 6: The Japanese Unexamined Patent Publication No. 2003-124049

Patent Article 7. The Japanese Unexamined Patent Publication No. 2003-133164

SUMMARY OF THE INVENTION

An object of the present invention is to provide a multilayer ceramic capacitor, by which an improvement of a TC bias characteristic can be expected while obtaining various electric characteristics, particularly a sufficient permittivity, even when an interlayer dielectric layer is made thin.

To attain the above objects, according to the present invention, there is provided a multilayer ceramic capacitor comprising an internal electrode layer and a dielectric layer having a thickness of less than 2 μm, wherein said dielectric layer contains a plurality of dielectric particles, and when it is assumed that standard deviation of a particle distribution of the entire dielectric particles in said dielectric layer is $\sigma$ (no unit), the $\sigma$ satisfies $\sigma<0.130$.

Preferably, when assuming that an average particle diameter of the entire dielectric particles in said dielectric layer is D50 (unit: μm) and a rate that dielectric particles (coarse particles) having an average particle diameter of 2.25 times of the D50 exist in said entire dielectric particles is p (unit: %), said p satisfies $p<12\%$.

The multilayer ceramic capacitor according to the present invention can be produced, for example, by the method below. Note that a production method of the multilayer ceramic capacitor of the present invention is not limited to the method below.

Note that, in the method below, the case where the dielectric layer contains a main component composed of barium titanate (barium titanate, wherein particularly the mole ratio m of the so-called A site and the B site is 0.990 to 1.35, expressed by a composition formula $(BaO)_{0.990\ to\ 1.035}.TiO_2$ will be explained as an example.

The method of producing a multilayer ceramic capacitor, comprising the steps of:

firing a stacked body formed by using a dielectric layer paste containing a dielectric material and an internal electrode layer paste containing an additive dielectric material;

wherein the dielectric material in the dielectric layer paste contains a main component material and a subcomponent material;

the main component material is barium titanate expressed by a composition formula $(BaO)_m.TiO_2$, wherein the mole ratio m is 0.990 to 1.035;

the additive dielectric material in the internal electrode layer paste contains at least an additive main component material; and the additive main component material is barium titanate expressed by a composition formula $(BaO)_{m'}.TiO_2$, wherein the mole ratio m' is $0.993<m'<0.50$.

In this method, A/B, that is the mole ratio m' of the A site (the "(BaO)" part in the above formula) and a B site (the "$TiO_2$" part in the above formula), of the additive main component material contained in the additive dielectric material in the internal electrode layer paste is adjusted. Due to this, an existing state of dielectric particles composing a fired dielectric layer can be easily controlled.

Note that a composition of a dielectric oxide composing the main component is not limited to the barium titanate expressed by the above composition formula $(BaO)_{0.990\ to\ 1.035}.TiO_2$, and dielectric oxides below can be generally applied. The dielectric oxides are expressed by a composition formula $(AO)_m.BO_2$, wherein the "A" is at least one element selected from Sr, Ca and Ba, "B" is at least one element of Ti and Zr, and the mole ratio m is 0.990 to 1.035.

Preferably, the additive main component material has an ignition loss of less than 10.00%, by controlling an ignition loss of the additive main component material as well as the mole ratio m' of the additive main component material, the existing state of dielectric particles suing the fired dielectric layers can be furthermore preferably controlled.

In this method, it is sufficient if the additive dielectric material includes "at least an additive main component material", and an additive subcomponent material is also contained in some cases. A composition of the additive subcomponent material in this case may be the same as or different from a composition of a subcomponent material included in the dielectric material in the dielectric layer paste.

A material composing the internal electrode layer of the multilayer ceramic capacitor is not particularly limited in the present invention and precious metals may be also used other than base metals. When composing the internal electrode layer by a base metal, the dielectric layer may contain a subcomponent including at least one kind of oxides of Mn, Cr, Si, Ca, Ba, Mg, V, W, Ta, Nb and R (R is at least one kind of rare earth elements, such as Y) and compounds to become these oxides due to firing, etc. other than the main component, such as barium titanate. As a result of containing the subcomponent, it is not made semiconductive even when fired in a reducing atmosphere and characteristics as a capacitor can be maintained. As explained above, when producing a multilayer ceramic capacitor having a dielectric layer containing a subcomponent other than the main component, the dielectric material contained in the dielectric layer paste contains a main component material and subcomponent material to form the main cement and subcomponent after firing. In this case, as explained above, an additive dielectric material contained in the internal electrode layer paste also contains additive subcomponent material other than the additive main component material.

Preferably, the dielectric layer contains barium titanate expressed by a composition formula of $(BaO)_m.TiO_2$, wherein the mole ratio m is 0.990 to 1.035, as a main component, a magnesium oxide and an oxide of rare earth elements as a subcomponent, furthermore, at least one kind selected from a barium oxide and a calcium oxide and at least one kind selected from silicon oxide, manganese oxide, vanadium oxide and molybdenum oxide as another subcomponent.

At this time, it in preferable that an additive dielectric material included in the internal electrode paste contains barium titanate expressed by a composition formula $(BaO)_{m'} \cdot TiO_2$, wherein the mole ratio m' is 0.993<m'<1.030, as an additive main component material and magnesium oxide (including a compound to be magnesium oxide after firing) and oxides of rare earth elements as additive subcomponent materials, furthermore, at least one kind selected from a barium oxide (including a compound to be a barium oxide after firing) and a calcium oxide (including a compound to be a calcium oxide after firing) and at least one kind of a silicon oxide, a manganese oxide (including a compound to be a manganese oxide after firing), a vanadium oxide and a molybdenum oxide.

Note that a dielectric layer simply expressed by "dielectric layer" means one or both of an interlayer dielectric layer and external dielectric layer in the present invention.

The present inventors focused on an existence state of a plurality of dielectric particles in a dielectric layer, committed themselves to study to find that an effect of improving a TC bias characteristic can be obtained while obtaining various electric characteristics, particularly a sufficient permittivity, even when a thickness of an interlayer dielectric layer is made thin to less than 2 μm by decreasing unevenness of particles by making a particle size distribution of the entire dielectric particles sharp In the dielectric layer, that is, to make a standard deviation σ of the particle distribution of the entire dielectric particles in the dielectric layer small.

By making the standard deviation a small, a rate p of large dielectric particles (coarse particles) existing in the entire dielectric particles in the interlayer electrode layer becomes small, but it is preferable that p<12% is satisfied as explained above. As a result, an effect of improving a TC bias characteristic is furthermore enhanced.

Namely, according to the present invention, it is possible to provide a multilayer ceramic capacitor, by which a TC bias characteristic can be expected to be improved while obtaining various electric characteristics, particularly a sufficient permittivity, even when an interlayer dielectric layer is made thin.

BRIEF DESCRIPTION OF DRAWINGS

These and other objects and features of the present invention will become clearer from the following description of the preferred embodiments given with reference to the attached drawings, in which.

DESCRIPTION OF THE PREFERRED EMBODIMENT

Below, the present invention will be explained based on embodiments shown in drawings.

In the present embodiment, as a multilayer ceramic capacitor having internal electrode layers and dielectric layers, a multilayer ceramic capacitor wherein a plurality of in internal electrode layers and interlayer dielectric layers are alternately stacked and external dielectric layers are arranged on both external end portions in the stacking direction of the internal electrode layers and interlayer dielectric layers will be explained as an example.

Multilayer Ceramic Capacitor

Figure 1:
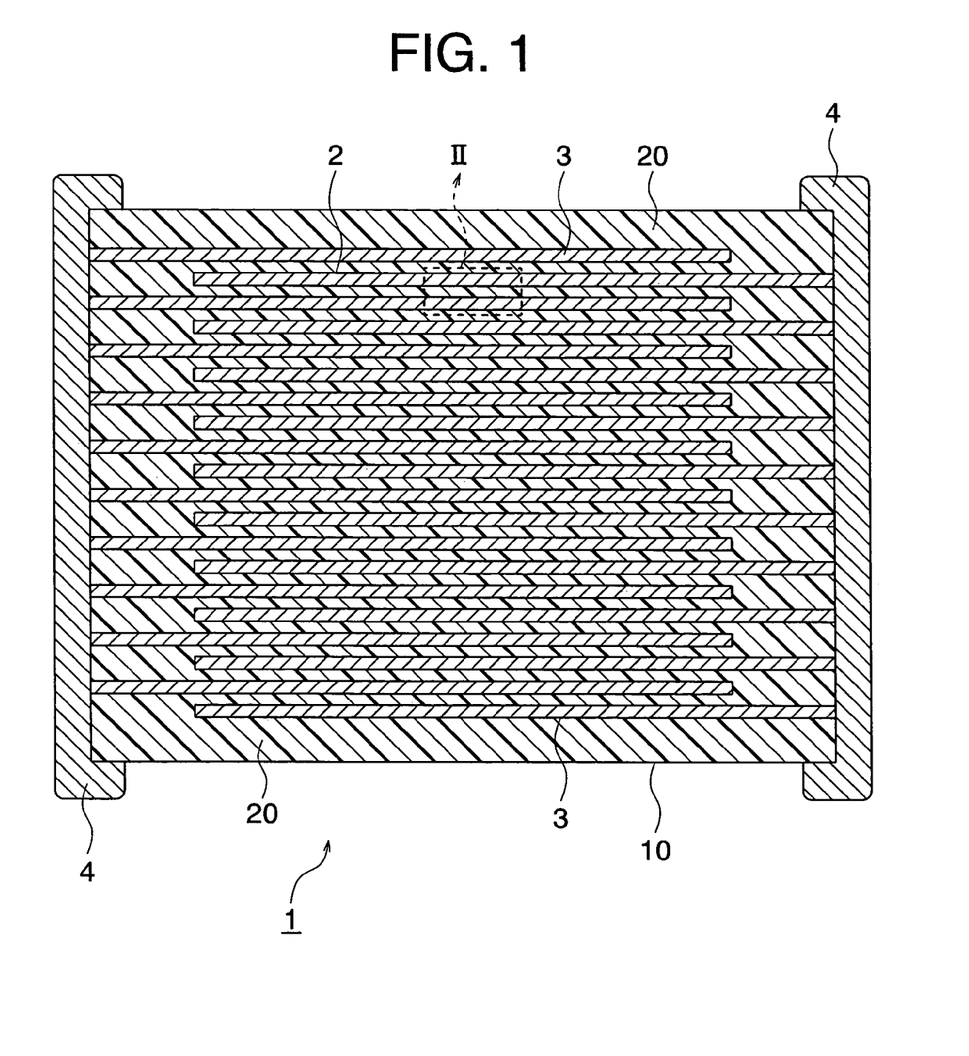
FIG. 1 is a schematic sectional view of a multilayer ceramic capacitor according to an embodiment of the present invention.

As shown in FIG. 1, a multilayer ceramic capacitor 1 according to an embodiment of the present invention has a capacitor element body having the configuration that interlayer dielectric layers 2 and internal electrode layers 3 are alternately stacked. On end portions on both sides of the capacitor element body 10, a pair of external electrodes 4 connected respectively to the internal electrode layers 3 arranged alternately inside the element body 10 are formed. The internal electrode layers 3 are stacked so that and surfaces on both sides are exposed alternately to surfaces of the mutually facing two end portions of the capacitor element body 10. The pair of external electrodes 4 are formed on both end portions of the capacitor element body 10 and connected to the exposed end surfaces of the alternately arranged internal electrode layers 3, so that a capacitor circuit is configured.

A shape of the capacitor element body 10 is not particularly limited; but is normally a rectangular parallelepiped shape. Also, a size thereof is not particularly limited and may be a suitable size in accordance with the use object, but is normally length (0.4 to 5.6 mm)×width (0.2 to 5.0 mm)× height (0.2 to 1.9 mm) or so.

In the capacitor element body 10, external dielectric layers 20 are arranged on both external end portions in the stacking direction of the internal electrode layers 3 and the interlayer dielectric layers 2 to protect inside the element body 10.

Interlayer-Dielectric Layer and External Dielectric Layer

Compositions of the interlayer dielectric layers 2 and external dielectric layers 20 are not particularly limited in the present invention and are composed, for example, of a dielectric ceramic position below.

A dielectric ceramic composition of the present invention contains as a main component barium titanate expressed by a composition formula $(BaO)_m \cdot TiO_2$, wherein a mole ration m is 0.990 to 1.035.

The dielectric ceramic composition of the present embodiment contains a subcomponent together with the above main component. As the subcomponent, those containing at least one kind of oxides of Mn, Cr, Ca, Ba, Mg, V, W, Ta, Nb and R (R is at least one kind of rare earth elements, such as Y) and compounds which becomes oxides by firing may be mentioned. By adding the subcomponent, characteristics as a capacitor can be obtained even by firing in a reducing atmosphere. Note that as an impurity, a, trace component of C, F, Li, Na, K, P, S and Cl, etc. may be contained by not more than 0.1 wt % or so. Note that, in the present invention, compositions of the interlayer dielectric layers 2 and the external dielectric layers 20 are not limited to the above.

In the present embodiment, it is preferable that a composition below is used as the interlayer dielectric layers 2 and the external dielectric layers 20. The composition contains barium titanate expressed by a position formula $(BaO)_m \cdot TiO_2$, wherein a mole ration m is 0.990 to 1.035, as a main component, a magnesium oxide and oxides of rare earth elements as a subcomponent and, as still another subcomponent, at least one kind selected from a barium oxide and a calcium oxide and at least one kind selected from a silicon oxide, a manganese oxide, a vanadium oxide and a molybdenum oxide. When calculating barium titanate in terms of $[(BaO)_{0.990\ to\ 1.035} \cdot TiO_2]$, a magnesium oxide in terms of MgO, oxides of rare earth elements in terms of $R_2O_3$, a barium oxide in terms of BaO, a calcium oxide in terms of CaO, a silicon oxide in terns of $SiO_2$, a manganese oxide in terms of MnO, a vanadium in of $V_2O_3$ and a molybdanum oxide in terms of $MoO_3$, the respective ratios with respect to 100 moles of $[(BaO)_{0.990\ to\ 1.035} \cdot TiO_2]$ are MgO: 0.1 to 3 moles, $R_2O_3$: more than 0 but not more than 5 moles, BaO+CaO: 0.5 to 12 moles, $SiO_2$: 0.5 to 12 moles, MnO: more than 0 mole but not more than 0.5 mole, $V_2O_5$: 0 to 0.3 mole and $MoO_3$: 0 to 0.3 mole.

Figure 2:
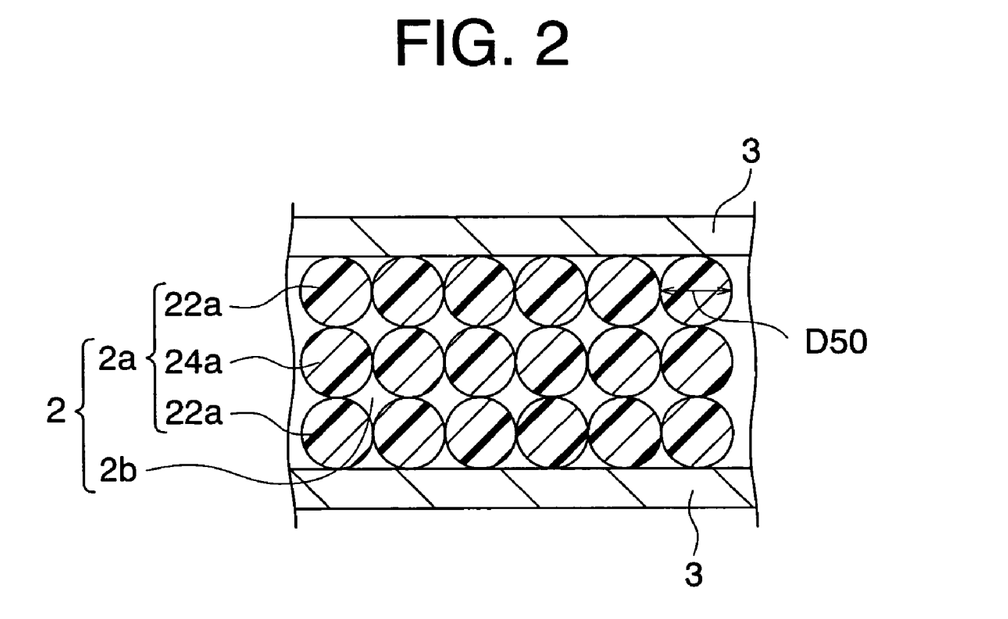
FIG. 2 is an enlarged sectional view of a key part of an interlayer dielectric layer 2 shown in FIG. 1.

Various conditions, such as the number layers to be stacked and the thickness, of the interlayer dielectric layers 2 may be suitably determined in accordance with the object and use and, in the present embodiment, a thickness of the interlayer dielectric layers 2 is made thin as preferably less than 2 µm, more preferably 1.5 µm or less, and furthermore preferably 1 µm or less. In the present embodiment, even when the thickness of the interlayer dielectric layer 2 is made thin as such, the TC bias characteristic is improved while obtaining various electric characteristics, particularly a sufficient permittivity. A thickness of the external dielectric layer 20 is, for example, 30 µm to several hundreds of µm or so.

As shown in FIG. 2, the interlayer dielectric layer 2 includes a plurality of dielectric particles 2a and a grain boundary phase formed between adjacent dielectric particles 2a.

The plurality of dielectric particles 2a are composed of contact dielectric particles 22a contacting the internal electrode layers 3 and non-contact dielectric particles 24a not contacting the internal electrode layers 3. The contact dielectric particles 22a contact one of a pair of internal electrode layers 3 sandwiching an interlayer dielectric layer 2 including the contact dielectric particles 22a and do not contact both of them.

Here, when assuming that standard deviation of a particle size distribution of the entire dielectric particles 2a in the interlayer dielectric layer (a part contributing to a capacitance) 2 is σ (no unit) and an average particle diameter of the entire dielectric particles 2a in the interlayer dielectric layer 2 is D50 (unit: µm), the ratio that dielectric particles (coarse particles) having an average particle diameter of 2.25 times of the D50 exist in the entire dielectric particles 2a is assumed to be p (unit: %). Note that the average particle diameter D50 of the entire dielectric particles 2a means an average particle diameter of the contact dielectric particles 22a and the non-contact dielectric particles 24a. The average particle diameter is an average particle diameter not including dielectric particles in the external dielectric layer 20 as a part not contributing to a capacitance. Note that the D50 here is a value obtained by cutting the capacitor element body 10 in the stacking direction of the dielectric layers 2 and 20 and internal electrode layers 3, measuring an average area of 200 or more dielectric particles 2a on the section shown in FIG. 2, calculating the diameter as an equivalent circle diameter, and multiplying the result by 1.5.

At this time, in the present embodiment, σ satisfies σ<0.130, preferably 0.125 or less, and more preferably 0.120 or less. When the a value σ too large, disadvantages arise that bias characteristics and reliability decline, etc. The smaller the lower limit of the σ is, the better.

In the present embodiment, it is preferable that p satisfies p<12%, and more preferably 10% or less. When the standard deviation σ is small, the ratio p is considered to become small being in proportional thereto. The smaller the lower limit of p is, the better.

Components of the grain boundary phase are normally an oxide of a material opposing the dielectric material or the internal electrode material, an oxide of a separately added material and an mode of a material mixed as an impurity in the procedure.

Internal Electrode Layer

The internal electrode layers 3 shown in FIG. 1 are composed of a conductive material of a base metal substantially serving as an electrode. As the base metal to be used as a conductive material, Ni or a Ni alloy is preferable. As a Ni alloy, an allay of at least one kind selected from Mn, Cr, Co, Al, Ru, Rh, Ta, Re, Os, Ir, Pt and W, etc. with Ni is preferable, and a Ni content in the allay is preferably 95 wt % or more. Note that the Ni or Ni alloy may contain a variety of trace components, such as P, C, Nb, Fe, Cl, B, Li, Na, K, F and S, by not more than 0.1 wt %.

In the present embodiment, a thickness of the internal electrode layers 3 is made thin as preferably less than 2 µm, and more preferably 1.5 µm or less.

External Electrode

An the external electrodes 4 shown in FIG. 1, at least one kind of Ni, Pd, Ag, Au, Cu, Pt, Rh, Ru and Ir, etc. or alloys of these may be normally used. Normally, Cu, a Cu alloy, Ni and a Ni alloy, etc., Ag, an Ag—Pd alloy and an In—Ga alloy, etc. are used. The thickness of the external electrodes 4 may be suitably determined in accordance with the use, and 10 to 200 µm or so is normally preferable.

Production Method of Multilayer Ceramic Capacitor

An example of a production method of the multilayer ceramic capacitor 1 according to the present embodiment will be explained next.

(1) First, a dielectric layer paste for composing the interlayer dielectric layers 2 and external dielectric layers 20 shown in FIG. 1 after firing and an internal electrode paste for composing the internal electrode layers 3 shown in FIG. 1 after firing are prepared.

Dielectric Layer Paste

The dielectric layer paste is fabricated kneading dielectric materials and an organic vehicle.

As the dielectric materials, main component materials and subcomponent materials for forming a main component and subcomponent for composing the dielectric layers 2 and 20 after firing are included. The respective component materials are suitably selected from a variety of compounds to be composite oxides and oxides, for example, carbonate, nitrate, hydroxides and organic metal compounds, etc. and mixed to use.

The dielectric materials are normally used as powder having an average particle diameter of 0.4 µm or less, an preferably 0.05 to 0.30 µm or so. Note that the average particle diameter here is a value obtained by observing particles of the materials by a SEM and calculated by an equivalent circle diameter.

The organic vehicle contains a binder and a solvent. As the binder, for example, ethyl cellulose, polyvinyl butyral, an acrylic resin, and other various normal binders may be used. Also, the solvent is not particularly limited and terpineol, butyl carbitol, acetone, toluene, xylene, ethanol and other organic solvents are used.

The dielectric layer paste may be formed also by kneading dielectric materials and a vehicle obtained by dissolving a water-soluble binder in water. The water soluble binder is not particularly limited, and polyvinyl alcohol, methyl cellulose, hydroxyethyl cellulose, a water-soluble acrylic resin and emulsion, etc. are used.

A content of the respective components of the dielectric layer paste in not particularly limited, and a dielectric layer paste may be fabricated, for example, to contain about 1 to 50 wt % of a solvent.

The dielectric layer paste may contain additives selected from various dispersants, plasticizers, dielectrics, subcomponent compounds, glass flits, and insulators, etc. in accordance with need. When adding these additives to the dielectric layer paste, the total mount is preferably not more than 10 wt % or so.

Internal Electrode Layer Paste

In the present embodiment, the internal electrode layer paste is fabricated by kneading a conductive material, additive dielectric material and an organic vehicle.

As the conductive material, Ni, a Ni alloy, furthermore, a mixture of these are used. The conductive material may be a spherical shape, a scale shape, etc. and the shape is not particularly limited, and may be a combination of these shapes. In the case of a spherical shape, an average particle diameter of the conductive material is normally 0.5 μm or less, and preferably 0.01 to 0.4 μm or so. It is to attain a highly thin layer. The conductive material is contained in the internal electrode layer paste by preferably 35 to 60 wt %.

The additive dielectric materials function to suppress sintering of internal electrodes (conductive material) in the firing step. In the present embodiment, the additive dielectric materials contain an additive main component material and an additive subcomponent material.

In the present embodiment, as an additive main component material, barium titanate expressed by a composition formula $(BaO)_{m'} \cdot TiO_2$, wherein the mole ratio m' is $0.993 < m' < 1.050$, preferably. $0.995 \leq m' \leq 1.035$, and more preferably $1.000 \leq m' \leq 1.020$, is used. By using barium titanate having an adjusted additive main component material value m', an existing state of dielectric particles 2a composing the dielectric layers 2 after firing is controlled and, even when the layer is made thin, the TC bias characteristic is improved while obtaining various electric characteristics, particularly permittivity. When the m' becomes large, the σ in the interlayer dielectric layers 2 of an obtained capacitor 1 tends to be small. When the m' becomes too large, it is liable that sintering become insufficient.

In the present embodiment, those having a specific ignition loss are used as an additive main component material. By using a main component material having a specific ignition loses as an additive, a particle configuration of the interlayer dielectric layer can be effectively controlled, and a bias characteristic of the capacitor 1 can be furthermore effectively improved. The ignition loss of the additive main component material is less than 10.00%, preferably 8.10%, more preferably 5.50% or less, and particularly preferably 3.85% or less. When the ignition loss becomes too large, it is liable that the bias characteristic cannot be improved. Note that the lower the lower limit of the ignition loss is, the more preferable. Ultimately, 0% is idealistic, but such an additive main component material is normally difficult to be produced.

Here, the "ignition loss" means a weight change rate when holding from 200° C. to 1200° C. for 10 minutes in thermal treatment (processing of heating from the room temperature to 1200° C. at a temperature rising rate of 300° C./hour in the air and maintaining at 1200° C. for 10 minutes) on the additive main component material. It is considered that the ignition loss is generated as a result that adsorption components and an OH group normally contained in the additive dielectric material are evaporated due to the thermal treatment.

An average particle diameter of the additive main component material may be the came as the particle diameter of a main component material contained in the dielectric material in the dielectric layer paste, but it is preferably smaller than that, more preferably 0.01 to 0.2 μm, and particularly preferably 0.01 to 0.15 μm. Note that the average particle diameter value is known to correlate with a specific surface area (SSA).

The additive dielectric materials (Only Additive main component materials are included in some cases, and both of additive main component materials and additive subcomponent materials are included in other cases. Below, it will be the same unless otherwise mentioned.) are not particularly limited but it is preferable to be produced, for example, by the oxalate method, hydrothermal synthesis method, sol-gel method, hydrolysis and alkoxide method, etc. By using these method, it is possible to efficiently produce an additive dielectric material including an additive main component material having the above specific ignition loss and m' (that in, A/B).

The additive dielectric material is included in the internal electrode layer paste preferably 5 to 30 wt %, and more preferably 10 to 2.0 wt % with respect to the conductive material. When a content of the additive dielectric material in the paste is too small, the effect of suppressing sintering of the conductive material declines, while when too large, continuity of the internal electrode declines. Namely, a disadvantage that a sufficient capacitance as a capacitor cannot be secured may be caused when the content of the a additive dielectric material is too small or too large.

The organic vehicle contains a binder and a solvent.

As the binder, for example, ethyl cellulose, an acrylic resin, polyvinyl butyral, polyvinyl acetal, polyvinyl alcohol, polyolefin, polyurethane, polystyrene, and copolymers of these, may be mentioned. The binder is contained in the internal electrode layer paste preferably by 1 to 5 wt % with respect to mixed powder of the conductive material and the additive dielectric material. When the binder is too scarce, the strength tends to decline, while when too much, metal filling density of an electrode pattern before firing declines and smoothness of the internal electrode layer 3 may be hard to be maintained after firing.

As the solvent, any of well known solvents, for example, terpineol, dihydroterpineol, butyl carbitol and kerosene, etc. may be used. A content of the solvent is preferably 20 to 50 wt % or so with respect to the entire paste.

The internal electrode layer paste may contain a plasticizer. As a plasticizer, benzylbutyl phthalate (BBP) and other phthalate esters, adipic acid, phosphoric ester and glycols, etc. may be mentioned.

(2) Next, a green chip is produced by using the dielectric layer paste and the internal electrode layer paste. When using a printing method, the dielectric layer paste and the internal electrode layer paste in a predetermined pattern are stacked by printing on a carrier sheet, cut to be a predetermined shape, and removed from the carrier sheet, so that a green chip is obtained. When using a sheet method, a green sheet is formed by forming the dielectric layer paste to be a predetermined thickness on a carrier sheet, the internal electrode layer paste is printed to be a predetermined pattern thereon, then, they are stacked to obtain a green chip.

Figure 3:
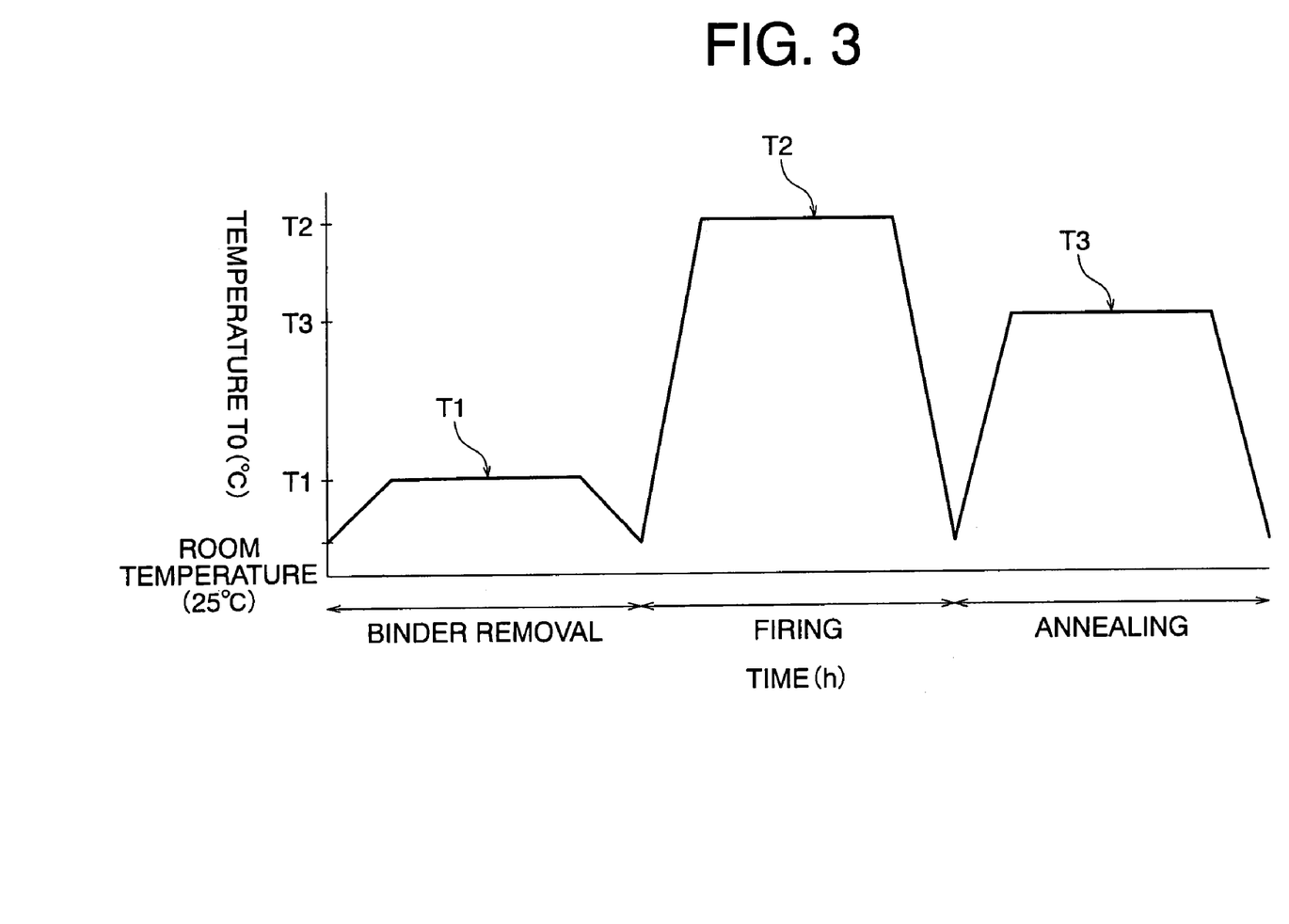
FIG. 3 is a graph showing respective temperature changes of binder removal processing, firing and annealing in an embodiment.

(3) Next, binder removal is performed on the obtained green chip. The binder removal is processing for, for example as shown in FIG. 3, raising atmosphere temperature T0 from the room temperature (25° C.) to binder removal holding temperature T1 at a predetermined temperature raising rate, holding at the T1 for predetermined time, then, lowering the temperature at a predetermined temperature lowering rate.

In the present embodiment, the temperature raising rate is preferably 5 to 300° C./hour, and more preferably 10 to 100° C. The binder removal holding temperature T1 is preferably 200 to 400° C. and more preferably 220 to 380° C., and the holding time at the T1 is preferably 0.5 to 24 hours, and more preferably 2 to 20 hours. The temperature lowering rate is preferably 5 to 300° C./hour, and more preferably 10 to 100° C./hour.

A processing atmosphere of the binder removal in preferably air or reducing atmosphere. As the reducing atmosphere, for example, a wet mixed gas of $N_2$ and $H_2$ is preferably used. An oxygen partial pressure in the processing atmosphere is preferably $10^{-4.5}$ to $10^5$ Pa. when the oxygen partial pressure is too low, the binder removal effect tends to decline, while when too high, the internal electrode layer tends to be oxidized.

(4) Next, the green chip is fired. The firing is processing for, for example as shown in FIG. 3, raising atmosphere temperature T0 from the room temperature (25° C.) to firing holding temperature T2 at a predetermined temperature raising rate, holding at the T2 for predetermined time, then, lowering the temperature at a predetermined temperature lowering rate.

In the present embodiment, the temperature raising rate is preferably 50 to 500° C./hour, and more preferably 100 to 300° C./hour.

The firing holding temperature T2 is preferably 1100 to 1350° C., more preferably 1100 to 1300° C., and furthermore preferably 1150 to 1250° C. The holding time at the T2 is preferably 0.5 to 8 hours, and more preferably 1 to 3 hours. When the T2 is too low, densification becomes insufficient even if the holding time at the T2 is made long, while when too high, grain growth of dielectric particles, breaking of electrodes, deterioration of a capacitance temperature characteristic due to dispersion of a conductive material composing the internal electrode layers, and reducing of a dielectric ceramic composition composing the dielectric layers are easily caused.

The temperature lowering rate is preferably 50 to 500° C./hour, and more preferably 150 to 300° C./hour. The firing processing atmosphere is preferably a reducing atmosphere. As a reducing atmosphere gas, for example, a wet mixed gas of $N_2$ and $H_2$ is preferably used.

An oxygen partial pressure in the firing atmosphere is preferably $6 \times 10^{-9}$ to $10^{-4}$ Pa. When the oxygen partial pressure in too low, a conductive material of the internal electrode layers is abnormally sintered to be broken, while when too high, the internal electrode layers tend to be oxidized.

(5) Next, when firing the green chip in a reducing atmosphere, it is preferable to successively perform thermal treatment (annealing). Annealing is processing for re-oxidizing the dielectric layers and characteristics as a capacitor as a final product can be obtained thereby.

Annealing is processing for, for example as shown in FIG. 3, raising atmosphere temperature T0 from the room temperature (25° C.) to anneal holding temperature T3 at a predetermined temperature raising rate, holding at the T3 for predetermined time, then, lowering the temperature at a predetermined temperature lowering rate.

In the present embodiment, the temperature raising rate is preferably 100 to 300° C./hour, and more preferably 150 to 250° C./hour.

The annealing holding temperature T3 is preferably 800 to 1100° C., and more preferably 900 to 1100° C. The holding time at the T3 is preferably 0 to 20 hours, and more preferably 2 to 10 hours. When the T3 is too low, oxidization of the dielectric layers 2 becomes insufficient, so that it is liable that the IR becomes low and the IR lifetime becomes short. When the T3 is too high, not only the internal electrode layers 3 is oxidized to decrease the capacity, but the internal electrode layers 3 react with the dielectric base material to easily cause deterioration of a capacity-temperature characteristic, a decline of the IR, and a decline of the IR lifetime.

The temperature lowering rate is preferably 50 to 500° C./hour, and more preferably 100 to 300°0 C./hour.

The annealing processing atmosphere is preferably a neutral atmosphere. As a neutral atmosphere gas, for example, a wet $N_2$ gas is preferably used. In the annealing, the atmosphere may be changed after raising to the holding temperature T3 in a $N_2$ gas atmosphere, or the whole annealing process may be performed in a wet Na gas atmosphere. An oxygen partial pressure in the annealing atmosphere is preferably $2 \times 10^{-4}$ to 1 Pa. When the oxygen partial pressure is too low, re-oxidization of the dielectric layers 2 becomes difficult, while when too high, the internal electrode layers 3 tend to be oxidized.

In the present embodiment, the annealing may have only the temperature raising step and the temperature lowering step. Namely, the temperature holding time may be zero. In this case, the holding temperature T3 is the same as the highest temperature.

In the above binder removal processing, firing and annealing, for example, a wetter, etc. may be used to wet a $N_2$ as and mixed gas, etc. In this case, the water temperature is preferably 75° C. or so. Note that the binder removal, firing and annealing may be performed continuously or separately.

As a result of the above respective processing, a capacitor element body 10 composed of a sintered body is formed.

(6) Next, external electrodes 4 are formed on the obtained capacitor element body 10. Formation of the external electrodes 4 can be attained by well known methods, such that after polishing end surfaces of the capacitor element body 10 composed of the above sintered body by barrel polishing or sand blast, etc., burning an external electrode paste containing at least one kind of Ni, Pd, Ag, Au, Cu, Pt, Rh, Ru and Ir, etc. or alloys of these, or applying an In—Ga alloy on the both end surfaces. A coverage layer may be formed by soldering, etc. on a surface of the external electrode 4 in accordance with need.

An explanation was made on embodiments of the present invention, but the present invention is not limited to the embodiments, and various modifications may be made within the scope of the present invention. For example, in the above embodiments, the binder removal processing, firing and annealing ware performed separately, but the present invention is not limited to this and at least two stops may be performed continuously. When performing continuously, it is preferable that the atmosphere is changed without cooling after the binder removal processing, the temperature is raised to the firing holding temperature T2 to perform firing, then, cooled to reach the annealing holding temperature T3, at which point the atmosphere is changed to perform annealing.

EXAMPLES

Below, the present invention will be explained further in detail based on examples, but the present invention is not limited to the examples.

Example 1

Production of Dielectric Layer Paste

First, a dielectric material, a polyvinyl butyral (PVB) resin as a binder, diotycle phthalate (DOP) as a plasticizer, and ethanol as a solvent were prepared.

The dielectric material was produced by wet mixing barium titanate having an average particle diameter of about 0.2 μm as a main component material (specifically, barium titanate expressed by a composition formula of $(BaO)_m \cdot TiO_2$, wherein the mole ratio m is 1.005), 0.2 mole % of MnC, 0.5 mole % of MgO, 0.3 mole % of $V_2C_5$, 2 mole % of $Y_2O_3$, 3 mole % of $CaCO_3$, 3 mole % of $BaCO_3$ and 3 mole % of $SiO_2$ as suboopponents for 16 hours by a ball-mill and dried.

Next, 10 wt % of a binder, 5 wt % of a plasticizer and 150 wt % of a solvent with respeat to the dielectric material were weighed, kneaded by a ball-mill and made to be a slurry, so that a dielectric layer paste was obtained.

Production of Internal Electrode Layer Paste

Ni particles having an average particle diameter of 0.2 μm as a conductive material, an additive dielectric material, an ethyl cellulose resin as a binder, and terpineol as a solvent were prepared.

As the additive dielectric material, what containing barium titanate (specifically, barium titanate expressed by a composition formula of $(BaO)_m \cdot TiO_2$: that is, $BaO_{m'} \cdot TiO_{2+m'}$) as an additive main component material, $MnCO_3$, MgO, $V_2O_5$, $Y_2O_3$, $CaCO_3$, $BaCO_3$ and $SiO_2$ as subcomponents was used. Note that as the barium titanate as an additive main component material, those having a mole ratio m' in the composition formula and an ignition loss changed as shown in Table 1 were used for respective samples.

Note that a value of an ignition loss of the additive main component material in each table is a value of a weight change rate (the unit is %) in a range of 200° C. to 1200° C. (10 minutes) in heating processing of heating barium titanate as additive main component material powder from the room temperature to 1200° C. at a temperature raising rate of 300° C./hour in the air, and holding at 1200° C. for 10 minutes. In Table 1, for example, "−5.00%" means that weight decreased by 5.00% in the case where weight heated at 200° C. was asaumed to be 100 and weight at 1200° C. after 10 minutes became 95. The calculations formula is given below.

Weight Change Rate=$((W_{after}-W_{before})/W_{before}) \times 100$

Note that $W_{after}$ was weight subjected to thermal treatment at 1200° C. for 10 minutes and $W_{before}$ was weight heated at 200° C. in the formula.

Next, 20 wt % of additive dielectric material was added to the conductive material. 5 wt % of a binder and 35 wt % of solvent were weighed and added to mixed powder of the conductive material and additive dielectric material, kneaded by a ball-mill, and made to be a slurry, so that an internal electrode layer paste was obtained.

Production of Multilayer Ceramic Chip Capacitor Sample

By using the obtained dielectric layer paste and the internal electrode layer paste, a multilayer ceramic capacitor 1 shown in FIG. 1 was produced as below.

First, the dielectric layer paste was applied to be a predetermined thickness to a PET film by a doctor blade method and dried, so that a ceramic green sheet having a thickness of 2 μm was formed. In the present embodiment, the ceramic green sheet as a first green sheet was prepared by a plural number.

The internal electrode pasta was formed to be a predetermined pattern on the obtained first green sheet, so that a ceramic green sheet having an electrode pattern having a thickness of 1 μm or so was obtained. In the present embodiment, this ceramic green sheet as a second green sheet was prepared by a plural number.

The first green sheets were stacked to be a thickness of 300 μm to for a green sheet group. On top of the green sheet group, 11 of second green sheets were stacked, further thereon, the same green sheet group as above was formed by stacking, heated and pressurized under a condition of a temperature of 80° C. and a pressure of 1 ton/cm² to obtain a green stacked body.

Next, the obtained stacked body was cut to be a size of 3.2 mm in length×1.6 mm by width×1.0 mm by height, then, binder removal processing, firing and annealing were performed under the condition below, so that a sintered body was obtained. A graph showing respective temperature changes of the binder removal, firing and annealing is shown in FIG. 3.

The binder removal was performed under a condition of a temperature raising rate of 30° C./hour, a holding temperature T1 of 260° C., a holding time of 8 hours, a temperature lowering rate of 200° C./hour and a processing atmosphere of an air atmosphere.

The firing was performed under a condition of a temperature raising rate of 200° C./hour, a holding temperature T2 as shown in Table 1, a holding time of 2 hours, a temperature lowering rate of 200° C./hour and a processing atmosphere of a reducing atmosphere (adjusted by letting a mixed gas of $N_2$ and $H_2$ into steam under an oxygen partial pressure of $10^{-6}$).

The annealing was performed under a condition of a temperature raising rate of 200° C./hour, a holding temperature T3 of 1050° C., a holding time of 2 hours, a temperature lowering rate of 200° C./hour and a processing atmosphere of a neutral atmosphere (adjusted by letting a $N_2$ gag into steam under an oxygen partial pressure of 0.1).

A wetter was used for wetting a gas in the firing and annealing, and the water temperature was 20°C.

An average particle diameter (D50) of entire dielectric particles 2a in the interlayer dielectric layers 2 was calculated as below. The obtained sintered body was polished to be half the length from the end portion of the internal electrode layers, then, the polished surface was subjected to mirror polish processing by a diamond paste. After that, thermal etching processing (a temperature raising rate and lowering rate of 300° C./hour; a holding temperature of 1200° C. and a holding time of 10 minutes) was performed, and particles were observed by a scanning electron microscope (SEM). Then, a section area (S) of particles was obtained from a SEM image showing a section condition of the sintered body after the thermal etching. Note that a position to be observed was a range of 100 μm×100 μm including the center of the polished surface, and five views (about 90 contact dielectric particles were observed per one view) were freely selected from this range. A shape of the dielectric particles was considered sphere, and a particle diameter (d) was obtained from the formula below. Particle Diameter (d)=2×($\sqrt{S/\pi}$)×1.5. The obtained particle diameters were made to be a histogram, and a value at which the degree accumulation becomes 50% was considered an average particle diameter (D50). The D50 value was calculated as an average value in the n number=250.

The standard deviation (σ) was calculated based on the next formula. Standard Deviation (σ)=$\sqrt{<<(n\Sigma x^2)-(\Sigma x)^2)/n(n-1))}$ A ratio p (unit: %) that dielectric particles (coarse particles) having an average particle diameter of 2.25 times of the D50 exist in the entire dielectric particles was also obtained from the above observation result.

Figure 4:
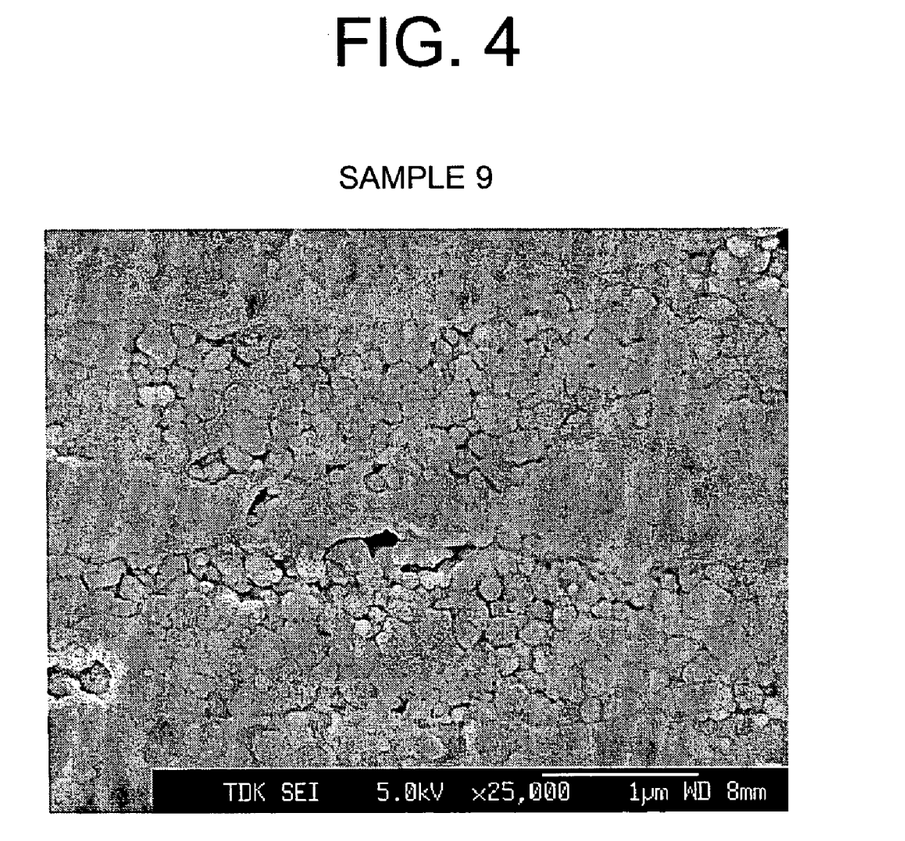
FIG. 4 is a SEM image showing a section condition of a sintered body after performing thermal etching on a sample 9 as an example.
Figure 5:
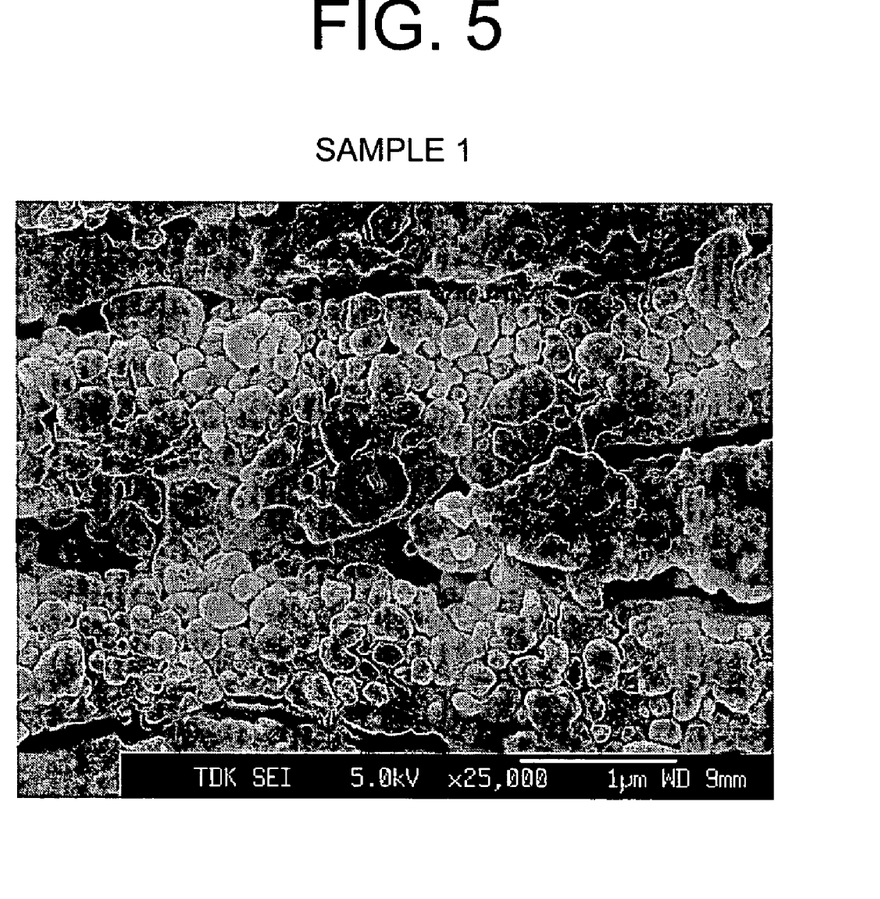
FIG. 5 is a SEM image showing a section condition of a sintered body after performing thermal etching on a sample 1 as a comparative example.
Figure 6:
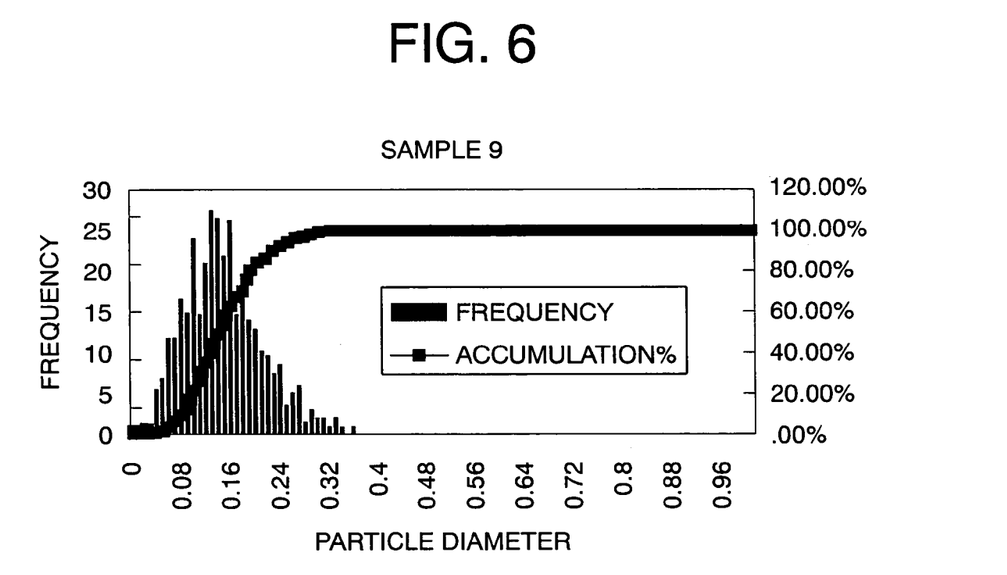
FIG. 6 is a graph of a relationship of a particle diameter and frequency of dielectric particles composing an interlayer dielectric layer in the sample 9 as an example.
Figure 7:
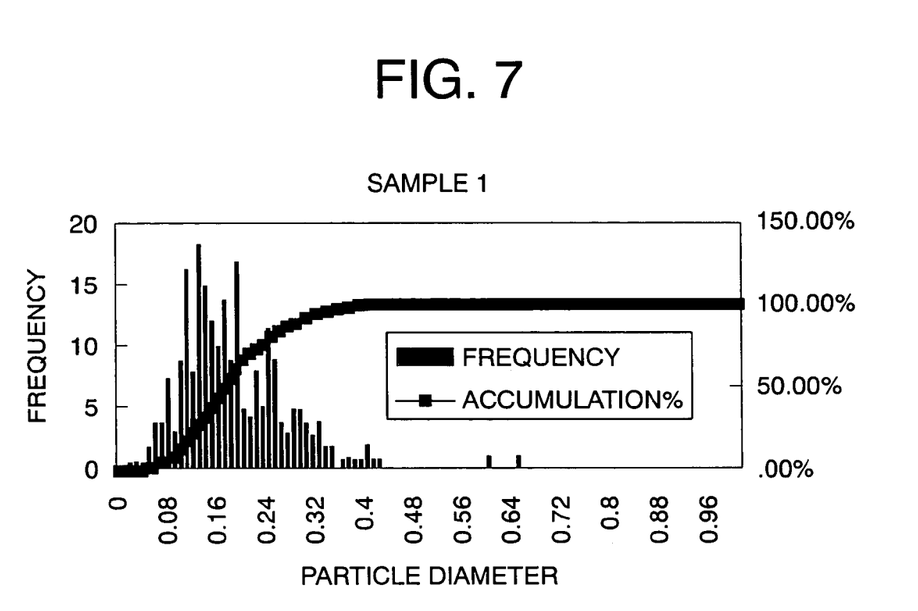
FIG. 7 is a graph of a relationship of a particle diameter and frequency of dielectric particles composing an interlayer dielectric layer in the sample 1 as a comparative example.

Note that FIG. 4 and FIG. 5 show SEM images of a section condition of the sintered body of sample 9 and sample 1 after thermal etching. FIG. 6 and FIG. 7 are graphs of a relationship of a particle diameter and frequency of dielectric particles composing an internal electrode layer in the sample 9 and sample 1, respectively.

For measuring electric characteristics, end surfaces of the obtained sintered body were polished by sand blast, then, an In—Ga alloy was applied to form a test electrode, so that a multilayer ceramic chip capacitor sample was obtained. A size of the capacitor sample was 3.2 mm by length×1.6 mm by width×1.0 mm by height, a thickness of an interlayer dielectric layer 2 was about 1.1 μm, ad a thickness of an internal electrode layer 3 was 0.9 μm.

A TC bias, direct-current dielectric breakdown strength, DC bias, and specific permittivity ∈ of the obtained capacitor samples were evaluated.

The TC bias was evaluated by measuring a bias voltage of the capacitor samples at 120 Hz, 0.5 Vrms and 2 V/μm in a constant chamber held at 85° C. by a digital LCR meter (4274A made by YHP) and calculating a capacity change rage from measured values at 20° C. not applied with a bias voltage. In the evaluation reference, those becoming larger than −25% were determined preferable.

The DC dielectric breakdown strength was obtained by applying a DC voltage at a temperature raising rate of 50 V/sec. to the capacitor samples, measuring a voltage when a leak current of 0.1 mA was detected (DC breakdown voltage: VB, unit: V/μm), and calculating the average value. In the evaluation reference, 35V or higher were determined preferable.

The DC bias was measured on the capacitor samples under a condition of a frequency of 120 Hz, the OSC of 0.625 Vrms/μm and a bias voltage of 0.5 V/μm at a reference temperature of 25° C. by a digital LCR meter (4274A made by YHP). In the evaluation reference, −8% or more were determined preferable.

The specific permittivity ∈ (no unit) was calculated from a capacitance measured on the capacitor samples under a condition of a frequency of 1 kHz, and an input signal level (measurement voltage) of 1.0 Vrms at a reference temperature of 25° C. by a digital LCR meter (4274A made by YHP). In the evaluation reference, 1700 or more were determined preferable.

The results are shown in Table 1.

TABLE 1

| Sample | Additive Main Component Material (BaTiO₃) A/B(m') | Ignition Loss % | Firing Temperature T2 ° C. | σ | p % | TC Bias | VB | DC Bias | ∈ | Evaluation | |
|---|---|---|---|---|---|---|---|---|---|---|---|
| *1 | 0.990 | −3.91 | 1240 | 0.138 | 15.00 | −26.3 | 12 | −8.9 | 2153 | X | |
| *2 | 0.991 | −3.81 | 1240 | 0.136 | 11.20 | −25.6 | 28 | −8.5 | 2100 | X | |
| *3 | 0.993 | −3.72 | 1240 | 0.130 | 11.17 | −25.2 | 31 | −8.2 | 2110 | X | |
| 4 | 0.995 | −3.83 | 1240 | 0.129 | 9.82 | −24.8 | 40 | −7.2 | 2180 | ○ | |
| 5 | 0.997 | −3.81 | 1240 | 0.125 | 6.51 | −24.2 | 59 | −6.9 | 2176 | ○ | |
| 6 | 1.001 | −5.30 | 1240 | 0.116 | 15.00 | −23.9 | 42 | −6.5 | 1978 | ○ | |
| 6-1 | 1.005 | −8.10 | 1240 | 0.096 | 7.41 | −23.1 | 65 | −6.5 | 1940 | ○ | |
| 7 | 1.005 | −4.20 | 1240 | 0.088 | 4.61 | −22.0 | 70 | −5.8 | 1900 | ○ | |
| 8 | 1.003 | −3.72 | 1240 | 0.069 | 4.53 | −21.3 | 65 | −5.3 | 1957 | ○ | |
| 9 | 1.020 | −3.91 | 1240 | 0.069 | 2.20 | −20.7 | 70 | −5.2 | 1785 | ○ | |
| *10 | 1.035 | −4.20 | 1240 | — | — | — | — | — | — | X | Insufficient Sintering |
| 11 | 1.035 | −4.20 | 1280 | 0.088 | 4.23 | −21.9 | 62 | −5.6 | 1850 | ○ | |
| *12 | 1.050 | −3.85 | 1350 | — | — | — | — | — | — | X | Insufficient Sintering |

The mark "*" indicates a comparative example in Table 1.

As shown in Table 1, in the samples 1 to 3 being out of a range of σ<0.130, the specific permittivity ∈ shows preferable values, however, all of the TC bias, the DC breakdown voltage VB and DC bias are poor. Particularly, as shown in FIG. and FIG. 7, in the sample 1, variation in particle diameter of the dielectric particles is wide even visually in the interlayer dielectric layer, and it is confirmed that coarse particles exist more or less.

On the other hand, in the samples 4 to 9 being in a range of the present invention, all of the ∈, TC bias, VB and DC bias were confirmed to be excellent. Particularly, as shown in FIG. 4 and FIG. 6, in the sample 9, variation in particle diameter of the dielectric particles is small visually in the interlayer dielectric layers, and it was confirmed that coarse particles scarcely exist. Also, from the samples 8 and 9, it was confirmed that even if the σ values are the same, an effect of improving the TC bias characteristic can be enhanced by making p small.

Note that in the sample 10, the firing temperature was low and the sintering became insufficient, so that the evaluation was not possible. In the sample 11, sintering insufficiency was prevented by heightening the firing temperature, and it was confirmed that all of the ∈, TC bias, VB and DC bias were excellent as same as in the samples 4 to 9 being in the range of the present invention. In the sample 12, sintering became insufficient even at a firing temperature of 1350° C., so that the evaluation was not possible.

Note that it was also confirmed from Table 1 that there was a tendency that the larger the σ was, the larger the p became.

Example 2

Other than changing a thickness of the interlayer dielectric layer 2 to 1.9 μm, 1.7 μm, 1.5 μm, 1.3 μm and 0.9 μm, capacitor samples were produced in the same way as in the example 1, and the same evaluation was made. As a result, the same results were obtained.

Comparative Example 1

Other than changing a thickness of the interlayer dielectric layer 2 to 2.0 μm and 2.2 μm, capacitor samples were produced in the same way as in the example 1, and the same evaluation was made. As a result, in the case where the thickness of the interlayer dielectric layer 2 was 2 μm or more, an effect of an additive dielectric material was small, so that grain growth of the dielectric layer was scarcely observed and almost no difference was recognized in an average particle diameter of the dielectric particles of the interlayer dielectric layer 2 by ceramic particles (additive dielectric material) in the internal electrode layers.

What is claimed is:

1. A multilayer ceramic capacitor comprising an internal electrode layer and a dielectric layer having a thickness of less than 2 μm, wherein
said dielectric layer contains a plurality of dielectric particles, and
when it is assumed that standard deviation of a particle distribution of the entire dielectric particles in said dielectric layer is σ (no unit), the σ satisfies σ<0.130.

2. The multilayer ceramic capacitor as set forth in claim 1, wherein, when assuming that an average particle diameter of the entire dielectric particles in said dielectric layer is D50 (unit: μm) and a rate that dielectric particles (coarse particles) having an average particle diameter of 2.25 times of the D50 exist in said entire dielectric particles is p (unit: %), said p satisfies p<12%.

* * * * *